United States Patent [19]
Sussman

[11] 3,905,609
[45] Sept. 16, 1975

[54] COLLET SEAL

[76] Inventor: Ernst Sussman, 634 Stefko Blvd., Bethlehem, Pa. 18106

[22] Filed: Mar. 4, 1974

[21] Appl. No.: 447,822

[52] U.S. Cl. ............... 279/20; 279/1 ME; 279/56; 408/59
[51] Int. Cl.² .......................................... B23B 31/20
[58] Field of Search ............ 279/1 Q, 1 ME, 20, 48, 279/56; 408/56, 57, 59; 277/DIG. 6, 228, 229

[56] References Cited
UNITED STATES PATENTS

| | | | |
|---|---|---|---|
| 1,009,303 | 11/1911 | Hansen | 279/20 X |
| 2,448,423 | 8/1948 | Dodge | 279/51 |
| 2,859,061 | 11/1958 | Reid | 277/228 |
| 3,024,030 | 3/1962 | Koch | 279/20 |

Primary Examiner—Harrison L. Hinson
Assistant Examiner—Z. R. Bilinsky
Attorney, Agent, or Firm—Sherman Levy

[57] ABSTRACT

A collet seal that includes a member that snuggly engages a collet in order to seal a tool, and wherein the seal may be made of a material such as ureathane.

2 Claims, 4 Drawing Figures

COLLET SEAL

The present invention relates to machine tools, and more particularly to a self-sealing collet that prevents coolants from escaping so that the coolant can only pass through the tool.

An object of the present invention is to provide a self-sealing collet that is adapted to use a member made of a material such as ureathane, or the like that has good memory characteristics.

Another object is to provide a collet seal that prevents the coolant from escaping from its proper pathway through the tool so that, for example, the coolant cannot escape past threaded joints, butt joints, or the like.

Further objects and advantages are to provide improved elements and arrangements thereof in a device of the character described that is relatively economical to produce, durable in form, and conducive to the most economical use of materials and uniformity of members formed therefrom.

Still further objects and advantages will become apparent in the subsequent description in this specification.

Figure 1:
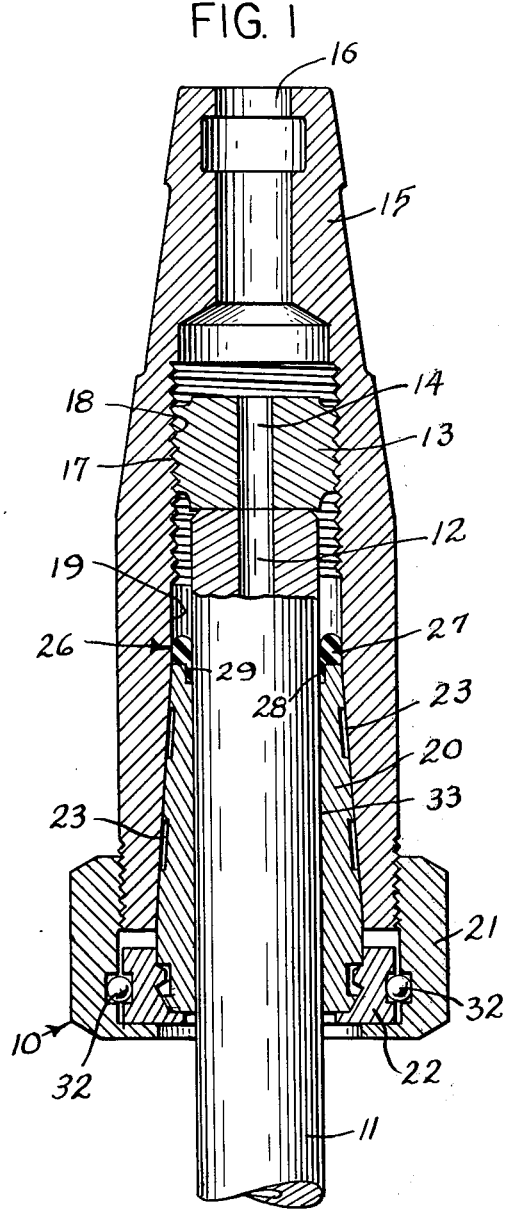
FIG. 1 is a vertical sectional view illustrating one application of the present invention.

Referring in detail to the drawings, the numeral 10 indicates a machine tool such as a portion of a drill assembly that includes a conventional tool 11 having a longitudinally extending centrally disposed passageway 12 therein. The numeral 13 indicates an end piece or adjusting nut that is arranged adjacent an end of the tool 11 to function as a stop therefor and such adjusting nut 13 has a passageway 14 that registers with the passageway 12. The numeral 15 indicates a casing or tool mounting member that is adapted to be mounted within a conventional drill spindle or the like (not shown) and receives the tool 11 and adjusting nut 13. The tool mounting member 15 has a coolant passageway or port 16 therein, FIG. 1 into which a liquid coolant or lubricant is introduced. As shown in the drawings, the tool mounting member 15 has a frusto-conical recess 19 which terminates in internal threads 17 that threadedly engage external threads 18 on the nut 13 whereby the nut can be adjusted to a desired position and maintained in adjusted position.

Figure 2:
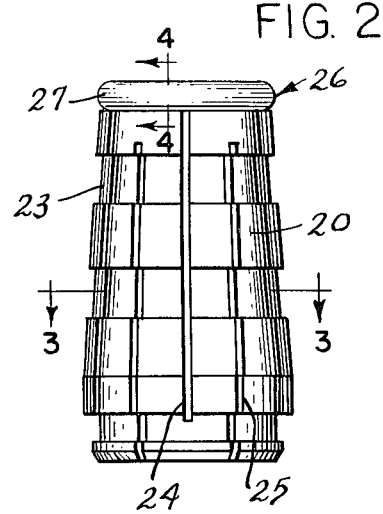
FIG. 2 is a side elevational view of the collet.
Figure 3:
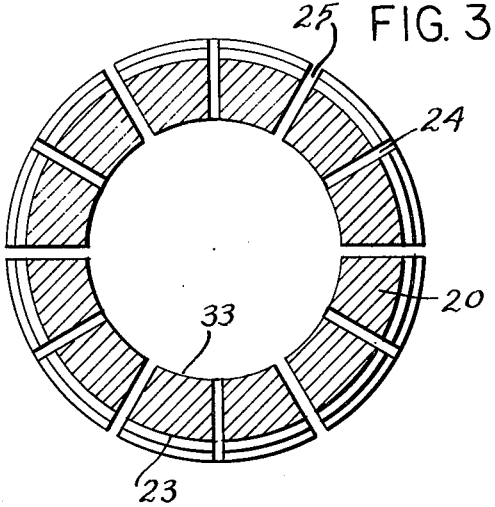
FIG. 3 is an enlarged sectional view taken from the line 3—3 of FIG. 2.

As shown in the drawings there is provided a tapered collet 20 as well as a retainer 21, and an inner element 22. The collet 20 is provided with spaced apart annular grooves 23 along the tapered exterior surface, FIG. 2, and the collet 20 also has spaced radially disposed, longitudinally extending grooves or slots 24 and 25 which assure that the collet will have sufficient give or resiliency to permit the clamping action to take place.

Figure 4:
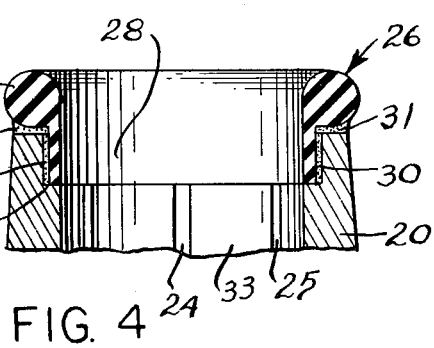
FIG. 4 is an enlarged sectional view taken on the line 4—4 of FIG. 2.

In accordance with the present invention, there is provided a collet seal that is indicated generally by the numeral 26, FIG. 4. A coolant seal 26 is an enlarged rounded portion 27 as well as a flange 28 of reduced size, and the flange 28 is received snuggly in a recess 29 that is formed or provided in an end of the collet 20. An end of the flange 28 is adapted to abut a shoulder 30 on the collet 20 and the flange 28 has a generally circular or annular formation. The numeral 31 indicates an adhesive by means of which the seal 26 is secured to the end of the collet 20.

As shown in FIG. 1, a bearing 32 is provided between the members 21 and 22 so that tightening of the retainer 21 causes the inner element 22 to move the collet 20 upwardly into the recess 19 and cause the interior 33 of the collet to clamp the upper portion of the tool 11.

From the foregoing, it will be seen that there has been provided a collet seal bonded to one end of the collet 20 and such collet is adapted to receive one end of the tool 11, and the seal 26 is positioned as shown in the drawings so that the annular flange 28 of the seal 26 is snuggly received in the recess 29. The rounded portion 27 of the seal 26 is arranged externally of the collet, and the seal 26 is adapted to be made of a material such as ureathane that has some resiliency or give or memory so that the same is capable of being slightly compressed in order to accommodate itself to the desired configuration.

When the parts are assembled as shown in FIG. 1, it will be noted that the tool mounting member 15 has its thread 17 threadedly engaging the threads 18, and the end of the tool 11 abuts the nut 13 so that the passageways 14 and 12 are in registry or alignment with each other. The port or passageway 16 is adapted to receive coolant such as a light oil from a suitable source or supply, and this coolant is adapted to flow in through the passageway 16 and then through the passageway 14 and then through the passageway 12 to the desired location so that the cooling of the tool or assembly can be accomplished in the desired manner.

With the seal 26 of the present invention, in the event that any of the liquid coolant oil leaks past or through the interengaging threads 17 and 18, or if any of the coolant leaks through the joint 19, the seal 26 will effectively prevent this coolant from escaping so that the coolant can only flow out through the passageways 14 and 12 to the area that is to be lubricated or cooled. Thus, the present invention provides a coolant seal 26 that prevents escape of the coolant from the assembly.

The parts can be made of any suitable material and in different shapes or sizes as desired or required.

The coolant seal of the present invention may be used in conjunction with a coolant spider assembly such as that shown in prior U.S. Pat. No. 3,726,363. However, it is to be understood that the seal can be used with other constructions or arrangements besides that shown in this prior patent.

The self-sealing collet of the present invention is arranged and constructed so that when being used for drills, such as the drill 11, the coolant enters the chamber, such as the chamber 16, and the seal 26 prevents the coolant from escaping from its proper location. The parts can be adjusted to permit different settings to be accomplished, and the seal provides a means for blocking the coolant from escaping. Thus, the collet, such as the collet 20, is adapted to be sealed. It is to be understood that the present invention is not limited to any particular style of collet. Some of the advantages of the present invention are that the collet will be sealed to prevent the coolant from escaping except through its proper path through the tool. The seal 26 may be made of ureathane since ureathane has good memory characteristics. Teflon may be applied to the outside of the seal 26 and the collet 20 to provide better slippage for the parts.

As a coolant, light weight oil may be used and such a lubricant will provide a cooling effect as well as helping to lubricate the parts. The seal 26 will prevent leakage from the various parts such as past the threads 17 and 18 as well as any leakage through the joint 19. The collet 20 has slots 24 and 25 therein so that when the member 21 is tightened, the collet can have the necessary give or resiliency to snuggly engage the tool 11. The end of the collet 20 has the recess 29 that snuggly receives the annular flange 28 of the seal 26.

Since many embodiments may be made of the instant inventive concept, and since many modifications may be made of the embodiment hereintofore shown and described, it is to be understood that the foregoing is to be interpreted merely as illustrative and not in limiting sense.

I claim:

1. A collet chuck comprising a tool mounting member provided with an elongated frusto-conical recess, said tool mounting member having an interior threaded portion, a passageway for introducing fluid into said member, an elongated tool having a fluid passageway located within the mounting member, an adjusting nut having a threaded exterior engaging the interior threaded portion of the tool mounting member, said adjusting nut having a fluid passage and being positioned contiguous to an end of the tool, a collet located within said frusto-conical recess, said collet having a tapered outer surface that is complimentary to the recess of said mounting member, said collet having a central bore of a size to receive a portion of said tool, said collet being provided with a plurality of radially disposed slots that permit the collet to be expanded and contracted, a coolant seal affixed to one end of said collet, said seal being of a sufficient size to sealingly engage the frusto-conical recess of said mounting member and said elongated tool, said coolant seal including an enlarged rouned toroidal portion and a flange of reduced size on one side of said toroidal portion, said flange being received snuggly in a circumferential recess that is provided in said end of the collet, an end of the flange abutting a shoulder on the collet and the flange having a generally circular formation, means on said mounting member for causing said collet to expand and contract to clampingly engage said tool whereby the fluid passes through the passageway of said mounting member and said tool but is prevented from passing around said tool by said collet and seal, said seal being made of a compressable material having memory characteristics, an adhesive for securing the seal to the end of the collet, said means for expanding and contrasting said collet comprising a retainer arranged in threaded engagement with said tool mounting member, an inner element arranged within said retainer, and a bearing interposed between said inner element and said retainer.

2. The structure as defined in claim 1 wherein the collet seal is made of ureathane, and wherein the collet seal is interposed between the inner surface of the tool mounting member and the outer surface of the tool.

* * * * *